United States Patent
Iida

(10) Patent No.: US 7,443,528 B2
(45) Date of Patent: Oct. 28, 2008

(54) IMAGE FORMING APPARATUS AND METHOD OF CONTROLLING SAME

(75) Inventor: Nobuyuki Iida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 10/811,919

(22) Filed: Mar. 30, 2004

(65) Prior Publication Data

US 2004/0190058 A1    Sep. 30, 2004

(30) Foreign Application Priority Data

Mar. 31, 2003    (JP) .............................. 2003-097185

(51) Int. Cl.
*G06F 15/00*    (2006.01)
*G06F 3/00*    (2006.01)
(52) U.S. Cl. .......................................... 358/1.15; 710/1
(58) Field of Classification Search ................ 358/1.15, 358/1.13, 407, 409; 710/1, 8–11, 16, 64, 710/72; 347/134, 140; 370/465; 399/45
See application file for complete search history.

(56) References Cited

U.S. PATENT DOCUMENTS

| | | | | |
|---|---|---|---|---|
| 5,781,310 A | * | 7/1998 | Nakamura et al. | 358/468 |
| 2003/0137577 A1 | * | 7/2003 | Shinohara | 347/134 |

* cited by examiner

*Primary Examiner*—Saeid Ebrahimi Dehkordy
(74) *Attorney, Agent, or Firm*—Fitzpatrick, Cella, Harper & Scinto

(57) ABSTRACT

Disclosed is a laser printer for forming an image by transferring images one after another to a printing medium from a plurality of photosensitive drums disposed along the transport path of the printing medium. The printer includes data processing units provided in correspondence with the drums in a number smaller than the number of drums, each of the data processing units processing an image signal and generating image data for image formation, and data transfer units, which are provided in correspondence with respective ones of the data processing units, for supplying the image forming units with image data that has been generated by the data processing units. If the length of the printing medium along the medium transport path is less than the overall length along which the plurality of drums are disposed, decoders and FIFO buffers are assigned commonly to one video interface and video data generated by these decoders is output to corresponding ones of video interfaces via the FIFO buffers.

18 Claims, 8 Drawing Sheets

IMAGE FORMING APPARATUS AND METHOD OF CONTROLLING SAME

FIELD OF THE INVENTION

This invention relates to an image forming apparatus for forming an image by transferring images one after another to a recording medium from a plurality of image carriers disposed along the transport path of the recording medium, and to a method of controlling this apparatus.

BACKGROUND OF THE INVENTION

A color laser printer known in the art has a plurality of developing stations for forming images corresponding to each of the colors. Each developing station has a photosensitive drum on the surface of which an electrostatic latent image is formed in accordance with laser light, and a transfer roller for visualizing the electrostatic latent image by toner and transferring the toner image to a printing paper transported to the transfer roller. Thus, images of a plurality of colors are transferred to the printing paper to print out a full-color image.

Such a printer that prints an image using a plurality of photosensitive drums has a decoder and a FIFO buffer associated with each photosensitive drum. High-speed printing of a full-color image can be achieved by supplying each of the image forming stations with video data of respective ones of the colors via the respective decoder and FIFO buffer concurrently and forming images corresponding to the colors concurrently using each of the photosensitive drums.

However, a printer of this type is such if the size of the printing paper is small or if has been decided in advance that the size of the printing paper used is smaller than a prescribed size, then it is conceivable that the printer may be put to practical use satisfactorily even if image formation for each of the colors is executed successively in conformity with transport of the print paper without forming images simultaneously on all of the photosensitive drums with which the printer is equipped.

SUMMARY OF THE INVENTION

Accordingly, a feature of the present invention is to provide an image forming apparatus which uses data processing units and data transfer units the number of each of which is less than the number of image carriers, thereby enabling image formation to be carried out by image forming units the number of which is greater than the number of data processing units and the number of data transfer units.

Further, a feature of the present invention is to use a data processing unit and a data transfer unit in common for data of a plurality of colors in accordance with the sequence of image formation on a plurality of image carriers, thereby reducing the number of data processing units and number of data transfer units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail with reference to the accompanying drawings. The structure of a laser printer ideal for application to this embodiment will be described as an example. However, the present invention is not limited to a printer having this structure.

First Embodiment

In a first embodiment of the present invention, which deals with a host-based laser printer having six photosensitive drums (image carriers), there will be described a case where maximum length L of usable paper is less than a length D along which the six photosensitive drums are arrayed (see FIG. 2). By means described below, the number of decoders (data processing units) for decoding video signals (image signals) of each of a number of colors and subjecting these signals to image processing and the number of FIFO buffers corresponding to data transfer units for outputting the decoded video data to laser units can be reduced and these can be utilized more effectively.

Figure 2:
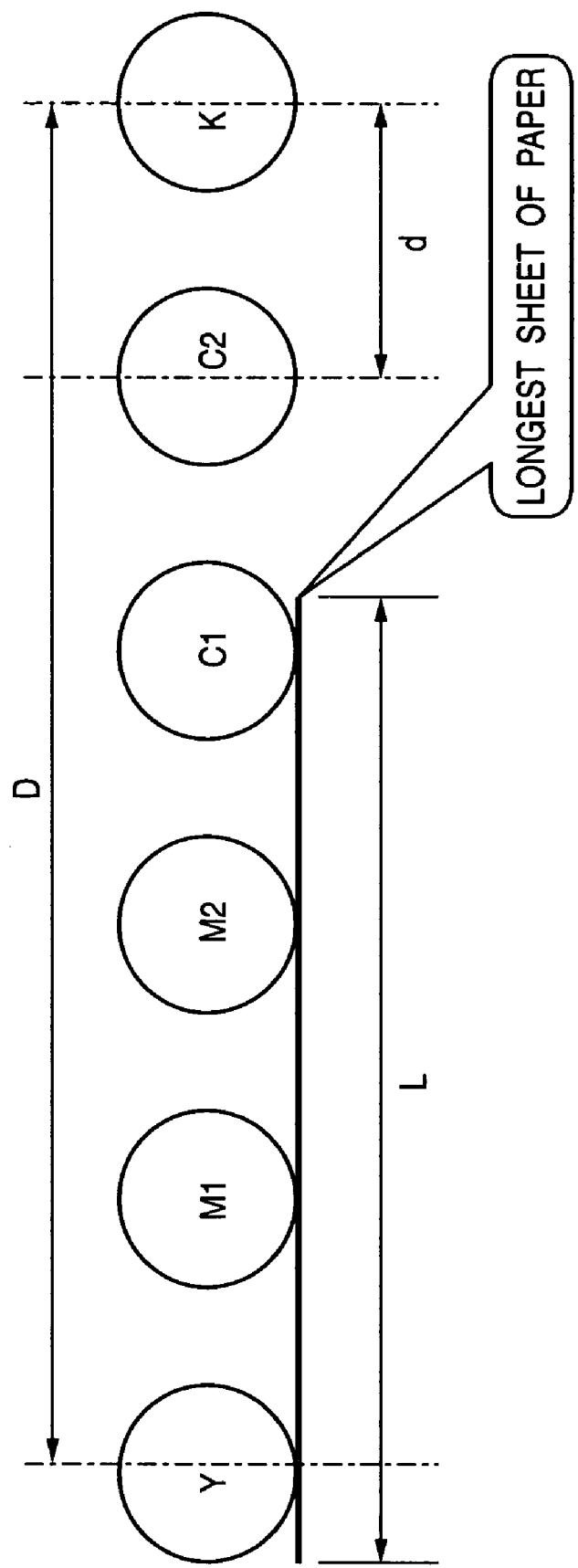
FIG. 2 depicts a diagram useful in describing the relationship between drum arrangement and size of printing paper in a 6-drum printer engine according to the embodiment.

In the example of FIG. 2, the maximum length L of the printing paper used in printing corresponds to the spacing (4 d) between four of the photosensitive drums, and therefore it will suffice if image formation is carried out by four of the drums concurrently. In this case, therefore, the number of colors of video data output to the printer engine simultaneously is four. This means that the number of decoders and number of FIFO buffers used is four each. With regard to the photosensitive drums for the colors C2 and K that the printing paper does not reach during image formation based upon the aforesaid four colors, it is so arranged that use is made of the decoder and FIFO buffer for the color Y at the extreme left, where image formation is completed first, and of the decoder and FIFO buffer for the next adjacent color M1, where image formation is completed next.

In the printer having the array of six photosensitive drums shown in FIG. 2, the photosensitive drums corresponding to the six colors Y, M1, M2, C1, C2, K are arranged in the order mentioned starting from the upstream side (the left side in FIG. 2) of the paper transport path.

Operation in this case is as follows:

(1) Image data (Y, M1, M2, C1, C2, K) that has been sent from a host personal computer is stored temporarily in a receive buffer.

(2) Video data of the colors Y, M1, M2, C1 is transferred to decoders 1 to 4, decoding of the video data is started and the decoded video data is output to video interfaces successively in response to a command from a printer engine.

(3) At the moment decoding of the Y data ends, the C2 data is transferred to decoder 1 that was being used by the Y data. In addition, the output destination of a FIFO buffer 1 to which the output of decoder 1 is input is changed over from a video interface 1 (for Y) to a video interface 5 (for C2) by a changeover unit. Next, when decoding of the M1 data ends, the K data is similarly transferred to decoder 2 that was using the M1 data and the output destination of a FIFO buffer 2 is changed over from a video interface 2 (for M1) to a video interface 6 (for K) by the changeover unit.

As a result of the operation above, the number of decoders and FIFO buffers is reduced to achieve a reduction in cost.

Figure 1:
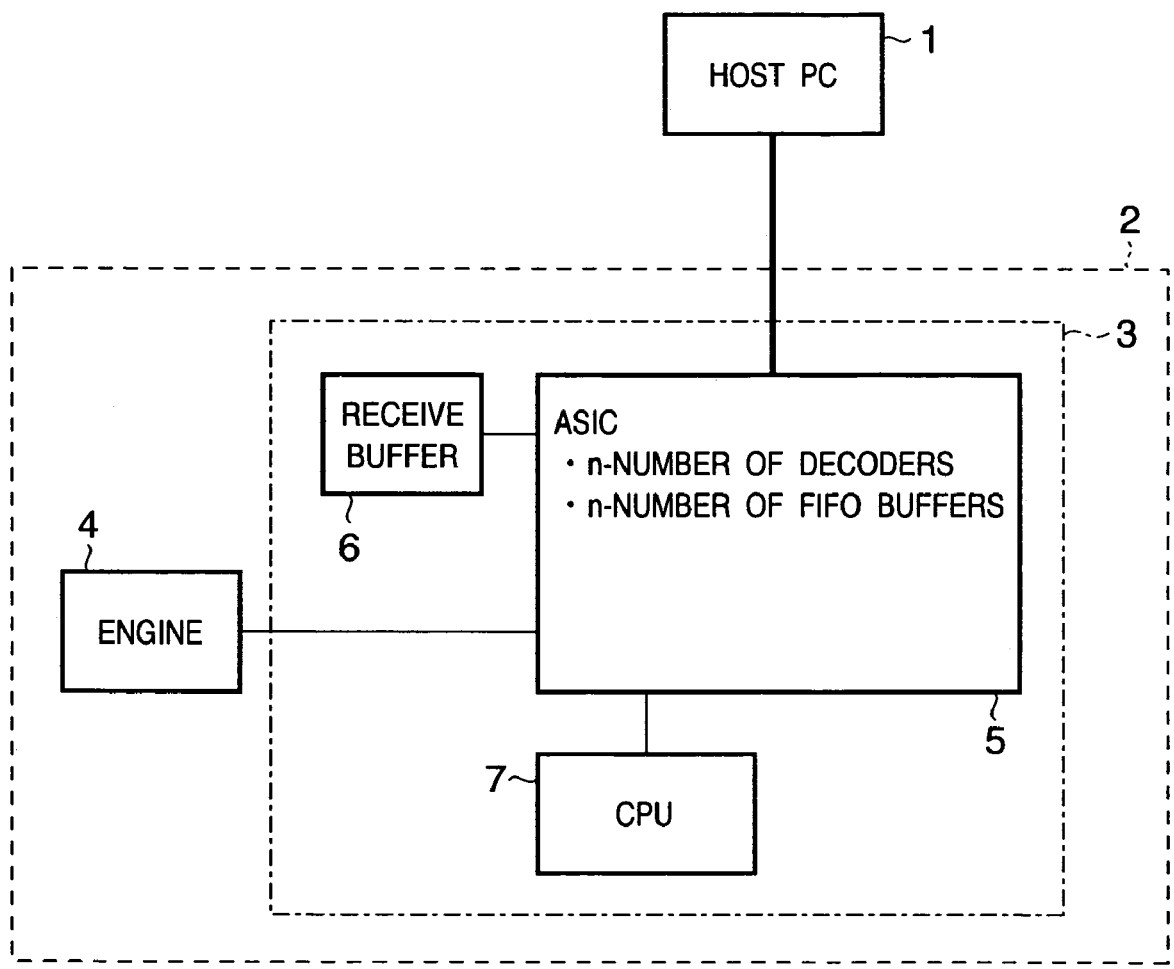
FIG. 1 is a block diagram illustrating the structure of a laser printer according to an embodiment of the present invention.

FIG. 1 is a block diagram illustrating the structure of a laser printer according to an embodiment of the present invention.

As shown in FIG. 1, a host computer (host PC) is connected to a host-based laser printer 2 of this embodiment. The host computer 1 transmits print data to the printer 2 and causes the printer 2 to print in accordance with the data. A printer controller 3 controls the operation of the printer 2. A printer engine 4, which has N-number of photosensitive drums, prints according to an electrophotographic method. The printer controller 3 has a controller 5 constituted by an ASIC. The controller 5 has n-number of decoders and n-number of FIFO buffers, where n is less than the number N (N=6 in the example of FIG. 2) of photosensitive drums in printer engine 4. A receive buffer 6 is constituted by a DRAM having memory areas for storing print data of the colors Y, M1, M2, C1, C2 and K, respectively. A CPU 7 receives and analyzes the print data and exercises control of the printer engine 4.

In the arrangement described above, print data that has been transmitted from the host computer 1 is stored temporarily in the receive buffer 6 upon being separated into the six colors mentioned above. If start of printing is specified by the host computer 1 after one page of print data, for example, has been stored in the receive buffer 6, operation of the printer engine 4 starts and print data of the colors (Y, M1, M2, C1, C2 and K) is read out of the corresponding memory areas in the receive buffer 6 in response to a data request from the printer engine 4. The print data read out is decoded and converted to video data by the decoders in the ASIC 5 and the video data is sent to corresponding laser units of the printer engine 4 via the FIFO buffers. As a result, electrostatic latent images of colors corresponding to the photosensitive drums are formed on respective ones of the drums concurrently and color images are transferred successively to a printing paper transported, by way of example, in the manner shown in FIG. 2, whereby a full-color image is printed on the printing paper. Switching among and selecting the decoders and FIFO buffers in the ASIC 5 is executed under the control of the CPU 7.

FIG. 2 depicts a diagram useful in describing the relationship between printing paper and the photosensitive drums in the printer engine 4 of the laser printer according to a first embodiment of the present invention. It should be noted that such components as laser units, developing units, transfer units and charging units, which are well known in electrophotography, are not shown in FIG. 2. Further, although FIG. 2 illustrates a case where the number of photosensitive drums is six, the present invention is not limited to such an arrangement.

The length D along which the six photosensitive drums (Y, M1, M2, C1, C2, K) are arrayed is equal to 5×d, where d represents the spacing between mutually adjacent photosensitive drums. The length L of maximum-size paper of usable printing paper satisfies the relation D>L, as shown in FIG. 2, and is also less than the total length of five photosensitive drum (i.e., 5 d>L). Accordingly, a maximum of four photosensitive drums are used simultaneously to transfer images to the printing paper at the time of printing.

In the case of the printer engine 4 having this structure, the number of items of video data requested simultaneously from the video interfaces also is four.

Accordingly, this embodiment is such that when output of the video data of the color Y ends after the video data of the colors Y, M1, M2, C1 is output simultaneously and image formation carried out, output of the video data of the color C2 is started. Then, when image formation based upon the video data of color M1 ends, image formation based upon the video data of color K is started. Thus, a color image consisting of image data of the six colors can be printed by four decoders and four FIFO buffers.

Figure 3:
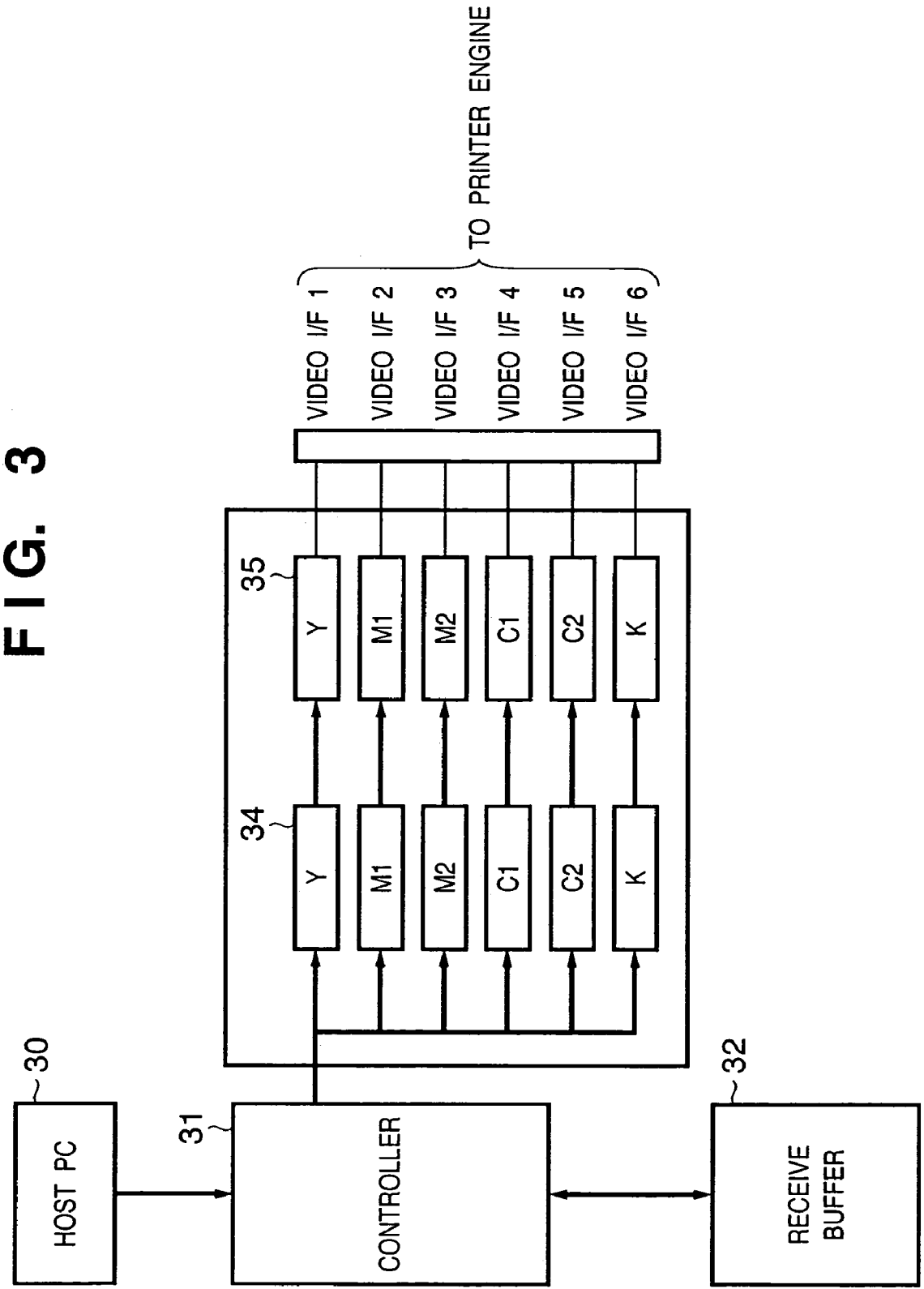
FIG. 3 is a block diagram useful in describing decoding and video outputs in an ordinary 6-drum laser printer.

FIG. 3 is a block diagram illustrating the structure of an ordinary laser printer having a 6-drum printer engine well known in the prior art.

When compressed print data (Y, M1, M2, C1, C2, K) of each of the colors is transmitted from a host computer 30, the print data is stored in a receive buffer 32. If printing starts in this manner, the print data is read out of the receive buffer 32 successively under the control of a controller 31 in accordance with a synchronizing signal from the printer engine, the data is decoded by decoders 34 provided for corresponding ones of the colors and the decoded data is transferred to video interfaces of the corresponding colors through FIFO buffers 35.

As a result, color images of six colors are printed concurrently.

Figure 4:
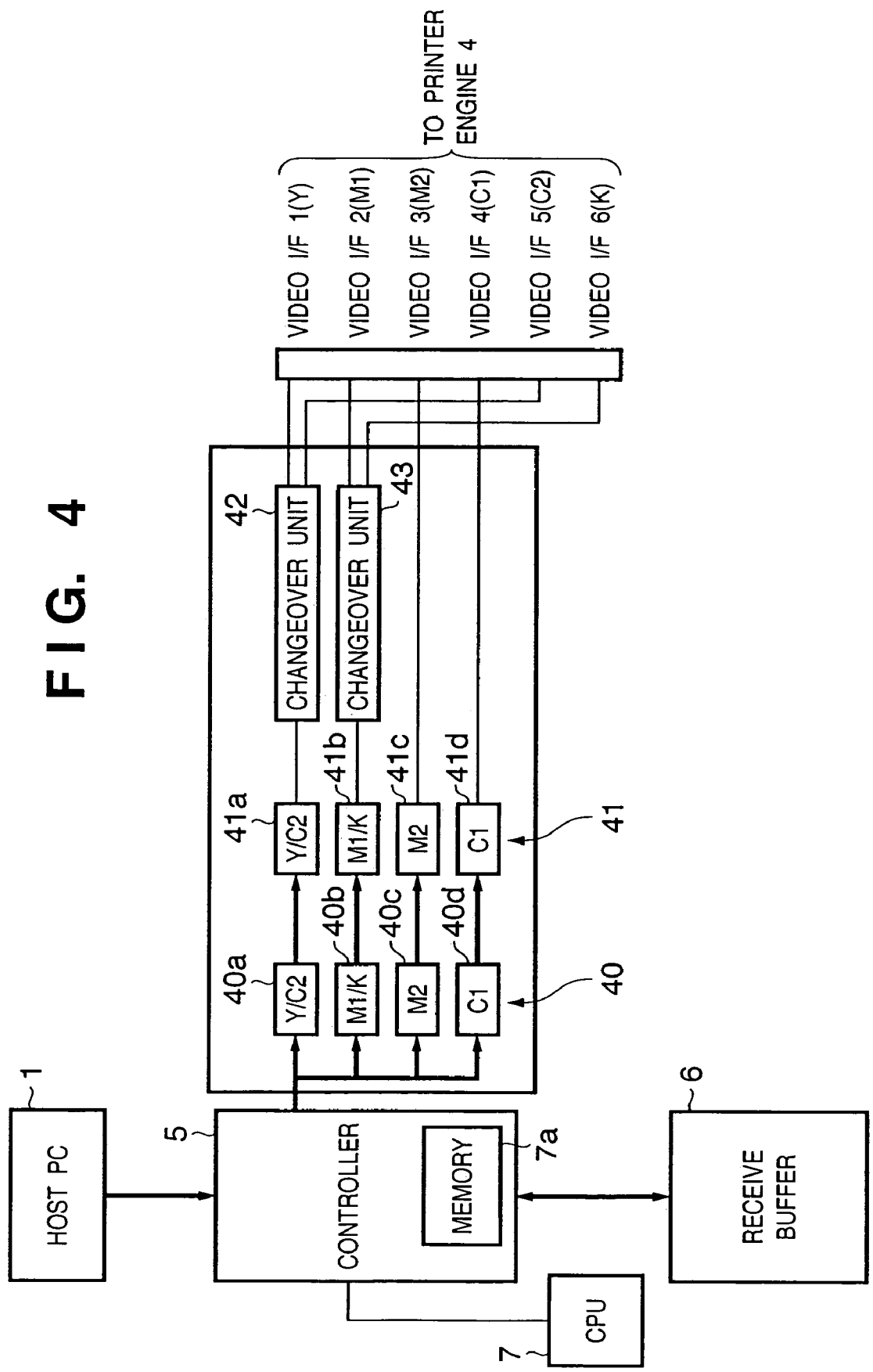
FIG. 4 is a block diagram useful in describing decoding and video outputs in a 6-drum laser printer according to a first embodiment of the present invention.

FIG. 4 is a block diagram illustrating the structure of laser printer having a 6-drum printer engine according to the first embodiment of the present invention.

When the compressed print data (Y, M1, M2, C1, C2, K) of each of the colors is transmitted from the host PC 1, the print data is received and stored in the receive buffer 6. If printing starts in this manner, the print data is converted to video data successively by decoders 40 in response to commands from the video interfaces and the video data is output to the printer engine 4 via FIFO buffers 41.

Here the maximum length of the printing paper used in printing corresponds to the total length of four drums, as shown in FIG. 2. Accordingly, image formation processing is executed concurrently for video data of four colors which, in the example of FIG. 2, initially are Y, M1, M2 and C1. Hence, as shown in FIG. 4, four decoders 40 and four FIFO buffers 41 are provided, and when video data of the colors Y, M1, M2 and C1 is output, decoders 40a to 40d and FIFO buffers 41a to 41d for the colors Y, M1, M2 and C1, respectively, are used. At this time the video data of the colors Y and M1 is output to video interfaces 1 and 2, respectively, by changeover units 42 and 43, respectively. Further, the video data of the colors M2 and C1 is output to video interfaces 3 and 4, respectively.

When image formation based upon the video data of the color Y ends, print data of the color C2 whose image is formed next is output to the decoder 40a for Y/C2 and the output of this decoder 40a is output via the FIFO buffer 41a for Y/C2. At this time the changeover unit 42 is changed over so as to deliver the output of the FIFO buffer 41a for Y/C2 to the video interface 5 whose output is sent to the photosensitive drum that corresponds to the color C2. As a result, image formation based upon the video data of the colors M1, M2, C1, C2 is executed concurrently.

Similarly, when image formation based upon the video data of color M1 ends, print data of the color K whose image is formed next is output to the decoder 40b for M1/K and the output of this decoder 40b is output via the FIFO buffer 41b for M1/K. At this time the changeover unit 43 is changed over so as to deliver the output of the FIFO buffer 41b for M1/K to the video interface 6 whose output is sent to the photosensitive drum that corresponds to the color K. As a result, image formation based upon the video data of the colors M2, C1, C2, K is executed concurrently.

Figure 8A:
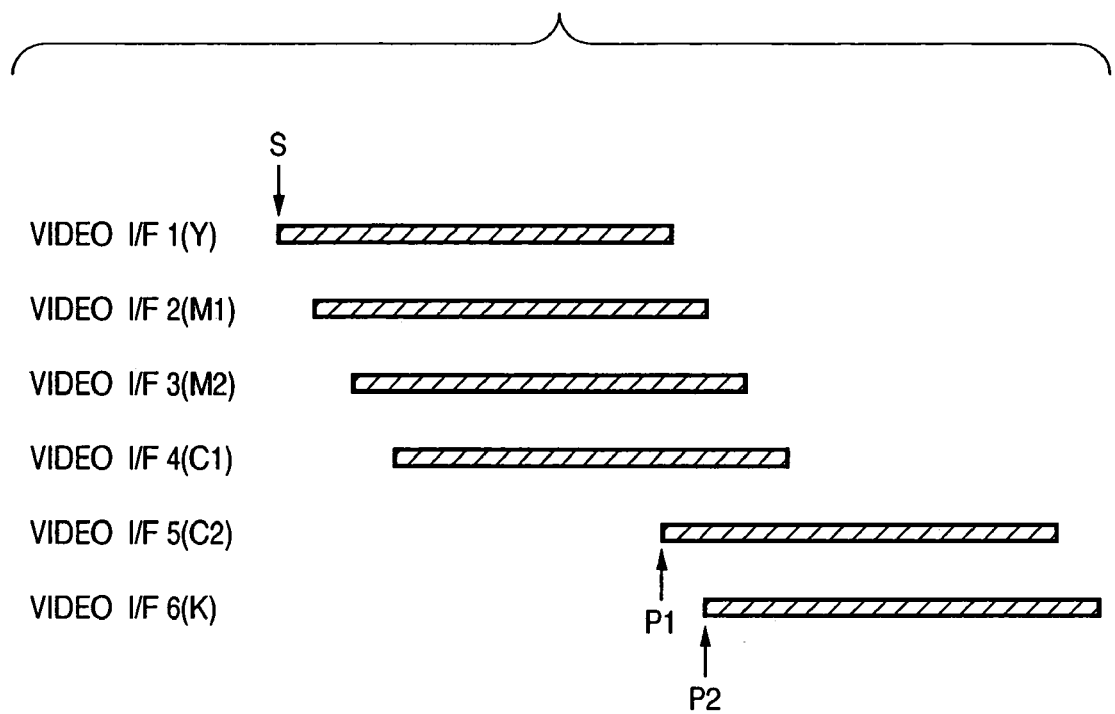
FIG. 8 depicts a diagram useful in describing timing of video outputs in the laser printers according to the first and second embodiments of the present invention.

FIG. 8A depicts a diagram useful in describing this processing for concurrent output of data via the six video interfaces.

If the printing operation starts at S in FIG. 8A, the decoding of the print data for the color Y and the output of the decoded data to the video interface 1 begin first. Then, following a prescribed length of time, decoding of the print data for the next color M1 and the output of the decoded data to the video interface 2 begin. Thus, decoding and image formation of print data for the four colors Y, M1, M2, C1 are executed concurrently. When image formation based upon the video data of the color Y ends at a timing P1, the decoding of print data for the color C2 corresponding to the fifth photosensitive drum using the decoder 40a that was being used in decoding the print data of color Y begins, and the output of the decoded data to the video interface 5 via the FIFO buffer 41a that was being used in buffering the print data of color Y begins. Thus, decoding and image formation of print data for the four colors M1, M2, C1, C2 are executed concurrently. When image formation based upon the video data, of the color M1 ends at a timing P2, the decoding of print data for the color K corresponding to the sixth photosensitive drum using the decoder 40b that was being used in decoding the print data of color M1 begins, and the output of the decoded data to the video interface 6 via the FIFO buffer 41b that was being used in buffering the print data of color M1 begins.

Figure 5:
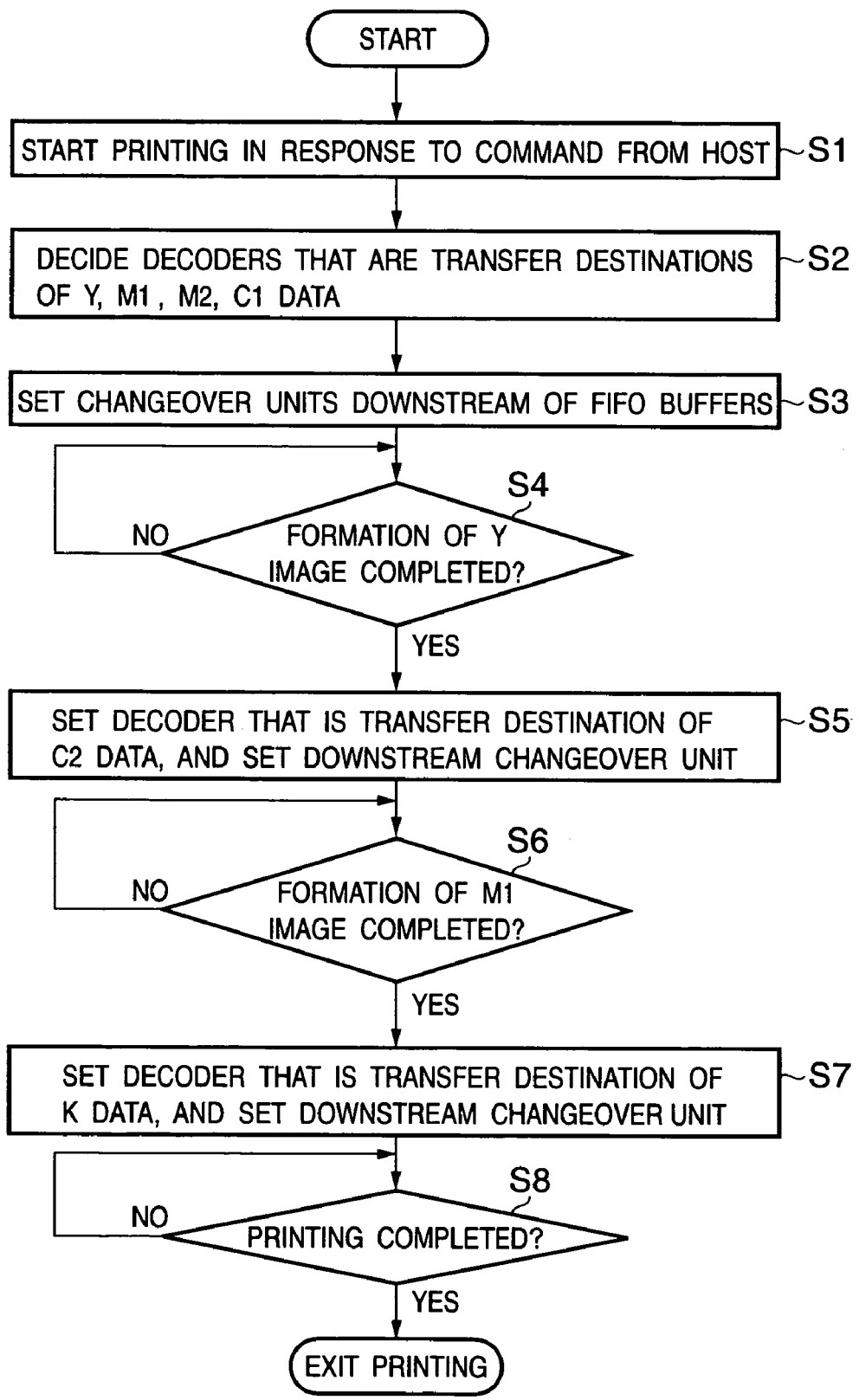
FIG. 5 is a flowchart for describing control processing in the 6-drum laser printer according to the first embodiment.

FIG. 5 is a flowchart illustrating processing executed by the laser printer according to the first embodiment of the present invention. The program that implements this processing has been stored in a memory 7a (see FIG. 4) and is executed under the control of the CPU 7.

This processing starts under conditions where, e.g., one page of print data has been stored in the receive buffer 6. If the host PC 1 commands start of printing at step S1, control proceeds to step S2. Here print data of the colors Y, M1, M2, C1, for which image formation is executed concurrently first among the print data (Y, M1, M2, C1, C2, K) for each of the colors stored in the receive buffer 6, is output to respective ones of the corresponding four decoders 40a to 40d and FIFO buffers 41a to 41d. Next, control proceeds to step S3, at which the changeover destinations of the changeover units 42, 43 downstream of the FIFO buffers 41a, 41b are decided. That is, the changeover unit 42 is changed over to deliver its output to the video interface 1 and the changeover unit 43 is changed over to deliver its output to the video interface 2.

Next, control proceeds to step S4, at which it is determined whether the decoding of the print data of the color Y has been completed as well as formation of the image of color Y. If image formation based upon the video data of the color Y has been completed, then control proceeds to step S5. Here the decoder that is the destination of transfer of the print data of color C2 for which image formation is to be executed next is set to the Y/C2 decoder 40a that was being used in decoding the print data of color Y. Then the changeover unit 42 is changed over from the video interface 1 for Y to the video interface 5 for C2.

Control then proceeds to step S6, at which it is determined whether the decoding of the print data of color M1 has been completed as well as formation of the image of color M1. If image formation based upon the video data of the color M1 has been completed, then control proceeds to step S7. Here the decoder that is the destination of transfer of the print data of color K for which image formation is to be executed next concurrently is set to the M1/K decoder 40b that was being used in decoding the print data of color M1. Then the changeover unit 43 is changed over from the video interface 2 for M1 to the video interface 6 for K. Image formation processing is thus executed until printing is found to be completed at step S8.

Thus, in accordance with the first embodiment, as described above, decoders and FIFO buffers can be used jointly for decoding print data, making it possible to lower the cost of the apparatus.

Second Embodiment

A second embodiment of the present invention will be described next.

The second embodiment will be described in regard to an example of a laser printer having four photosensitive drums.

In the second embodiment, the relationship between length L0 of the printing paper and drum spacing d is $2 \times d \geq L0$. That is, image formation performed concurrently by two photosensitive drums becomes possible, in which case two decoders and two FIFO buffers suffice.

However, maximum length L of printing paper usable with this laser printer is $4 \times d = L$. With the printer according to the second embodiment, therefore, four decoders are four FIFO buffers are provided.

The second embodiment will be described below for a case where $2 \times d \geq$ (paper length) holds.

In this case, two decoders and two FIFO buffers suffice and therefore two decoders and two FIFO buffers are redundant. By exploiting this effectively and using two FIFO buffers simultaneously for one color, there are fewer occurrences of a phenomenon where video data is not in time for the printing operation performed by the printer engine 4. Further, by assigning the extra FIFO buffers to color data for which there is much print data having a poor compression rate, it is possible to reduce occurrences of the phenomenon where video data is not in time for the printing operation.

Operation for such a case will now be described.

(1) The host PC 1 specifies how many decoders are to be used.

(2) The host PC 1 specifies to which colors the extra FIFO buffers are to be assigned.

(3) Print data (Y, M, C, K) that has been sent from the host PC 1 is stored temporarily in the receive buffer 6.

(4) Data of the colors Y and M is transferred from the receive buffer 6 to a Y/C decoder for Y and to an M/K decoder for M.

(5) The result of decoding the print data of color Y is stored in two Y/C FIFO buffers via a selector. The results of decoding the print data of color M also is stored in two M/K FIFO buffers via the selector.

(6) Thus, two FIFO buffers are assigned to each color. However, Y and C, M and K are used on a time-shared basis and are not employed simultaneously. The two FIFO buffers for each color store data in such a manner that one FIFO buffer stores odd-numbered lines and the other FIFO buffer stores even-numbered lines, by way of example.

(7) When decoding of print data of color Y is completed, the print data of color C is transferred from the receive buffer 6 to the Y/C decoder.

(8) The result of decoding the print data of color C is stored is stored in two Y/C FIFO buffers via the selector.

(9) If decoding of the print data of color M is finished, the print data of color K is transferred from the receive buffer 6 to the M/K decoder.

(10) The result of decoding the print data of color K also is stored in two M/K FIFO buffers via the selector. That is, the result of decoding the print data of color K is stored in two M/K FIFO buffers in a manner similar to that for Y and M.

(11) The output destinations (video interfaces 1 to 4) conforming to each of the colors are selected.

As a result of this operation, FIFO buffers the number of which is twice the usual number can be used for the video data of each color, and therefore it is possible to suppress the occurrence of a situation in which printing can no longer be performed because transfer of the video data is not in time. In addition, even print data for which the speed of decoding cannot keep pace owing to poor compression efficiency can be printed while following up the operation of the printer engine 4.

Figure 6:
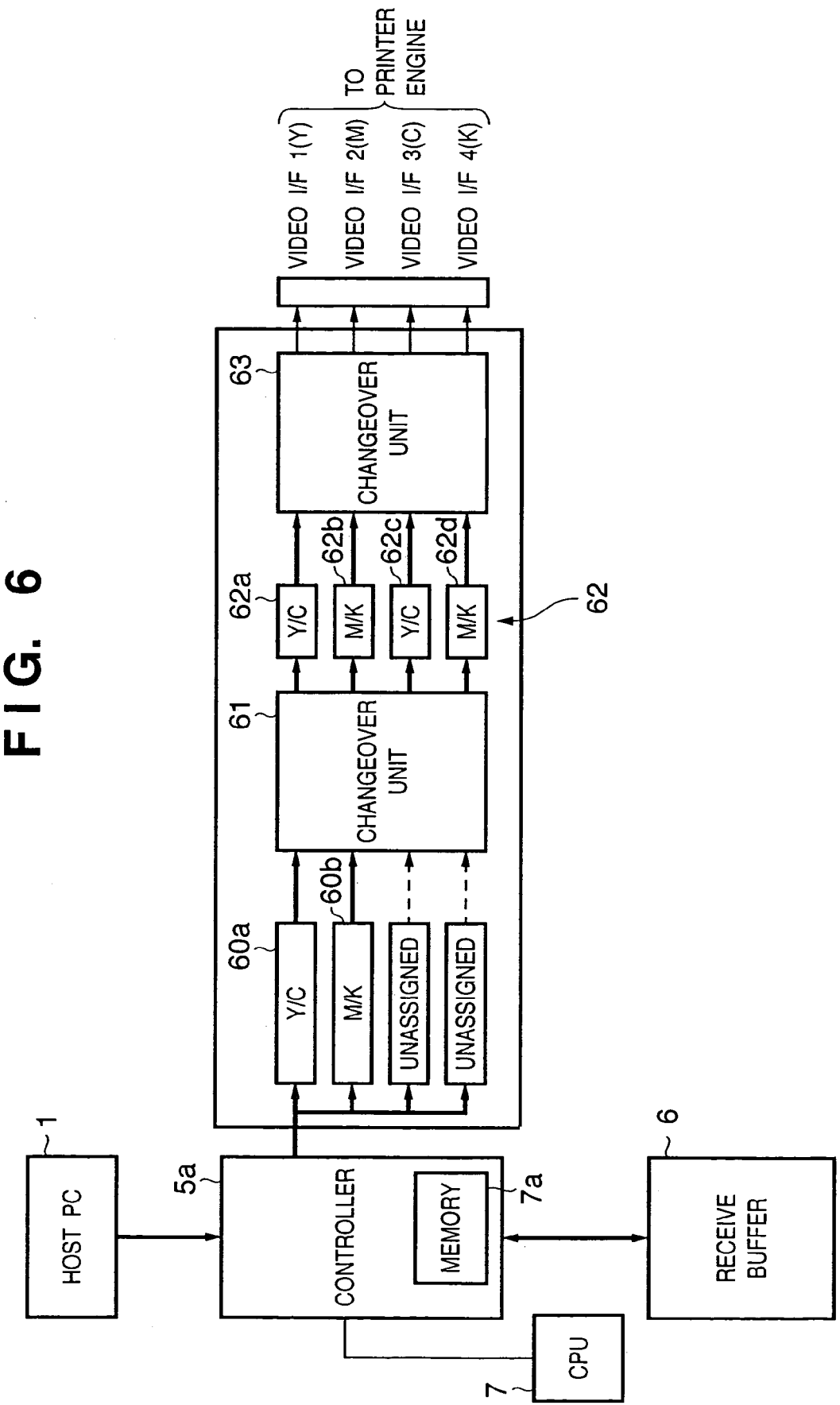
FIG. 6 is a block diagram useful in describing decoding and video outputs in a 4-drum laser printer according to a second embodiment of the present invention.

FIG. 6 is a block diagram illustrating the structure of laser printer having a 4-drum (Y, M, C, K) printer engine according to the second embodiment of the present invention.

When the compressed print data (Y, M, C, K) of each of the colors is transmitted from the host PC 1, the print data is received and stored in the receive buffer 6. If printing starts in this manner, print data of the colors Y and M is converted to video data successively by a Y/C decoder 60a and an M/K decoder 60b, respectively, in response to commands from the video interfaces and the video data is output to the printer engine 4 via FIFO buffers 62.

Here the maximum length of the printing paper used in printing corresponds to the spacing (d) between two drums. Accordingly, image formation processing is executed concurrently for video data of two colors. Hence, as shown in FIG. 6, decoders 60a, 60b, selectors 61, 63 and FIFO buffers 62a to 62d are provided. When video data of the colors Y, M is output, the print data of color Y is decoded by the Y/C decoder 60a, the output of this decoder 60a is changed over by the selector 61 and is output to the video interface 1 via Y/C FIFO buffers 62a, 62c. Further, the print data of color M is decoded by the M/K decoder 60b, the output of this decoder 60b is changed over by the selector 61 and is output to the video interface 2 via. Y/C FIFO buffers 62b, 62d.

When the print data of color Y is thus transferred to the Y/C decoder 60a and image formation based upon the video data of color Y is completed, print data of color C for which image formation is to be performed next is read out of the receive buffer 6 and transferred to Y/C decoder 60a (this is the decoder that until now was being used to decode the print data of color Y). The output of the Y/C decoder 60a is then sent to Y/C FIFO buffers 62a, 62c by the selector 61 and the outputs of the Y/C FIFO buffers 62a, 62c are changed over by the selector 63 and output to the video interface 3.

Similarly, when the print data of color M is thus transferred to the M/K decoder 60a and image formation based upon the video data of color M is completed, print data of color K for which image formation is to be performed next is read out of the receive buffer 6 and transferred to M/K decoder 60b (this is the decoder that until now was being used to decode the print data of color M). The output of the M/K decoder 60b is then sent to M/K FIFO buffers 62b, 62d by the selector 61 and the outputs of the M/K FIFO buffers 62b, 62d are changed over by the selector 63 and output to the video interface 4.

Thus, two FIFO buffers are used for the video data of each of the colors. In other words, a plurality of FIFO buffers are used in time-shared fashion for Y and C and for M and K, respectively.

Figure 8B:
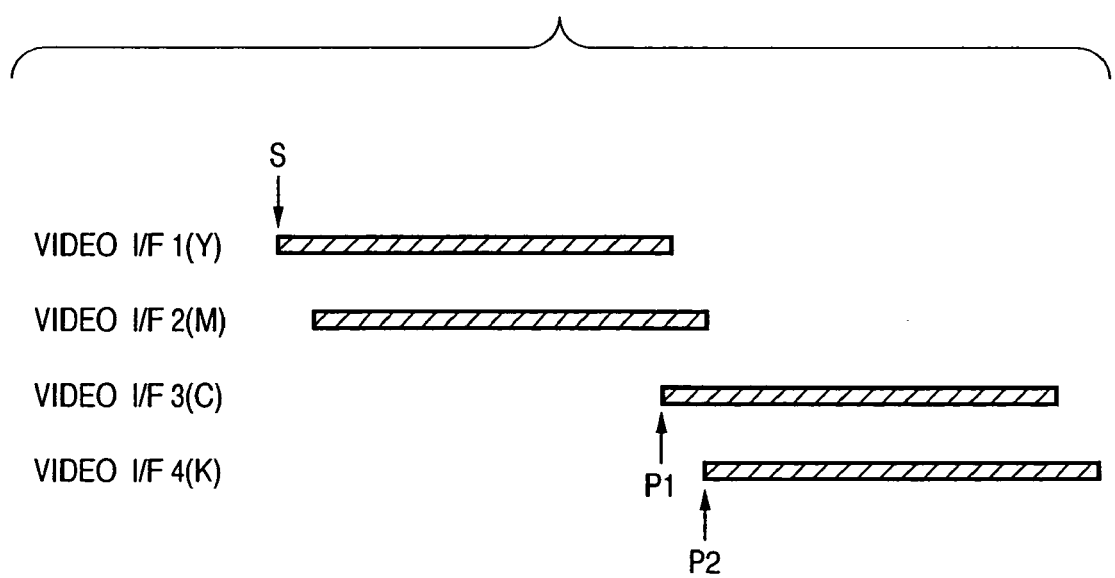

FIG. 8B depicts a diagram useful in describing this processing for concurrent output of data via the four video interfaces.

If the printing operation starts at S in FIG. 8B, the decoding of the print data for the color Y and the output of the decoded data to the video interface 1 begin first. Then, following a prescribed length of time, decoding of the print data for the next color M and the output of the decoded data to the video interface 2 begin. Thus, decoding and image formation of print data for the two colors Y, M are executed concurrently. When image formation based upon the video data of the color Y ends at a timing P1, the decoding of print data for the color C corresponding to the third photosensitive drum and the output of the decoded data to the video interface 3 begin. Thus, decoding and image formation of print data for the two colors M, C are executed concurrently. When image formation based upon the video data of the color M ends at a timing P2, the decoding of print data for the color K corresponding to the fourth photosensitive drum and the output of the decoded data to the video interface 4 begin. After then decoding and image formation of print data for the two colors C, K are executed concurrently.

Figure 7:
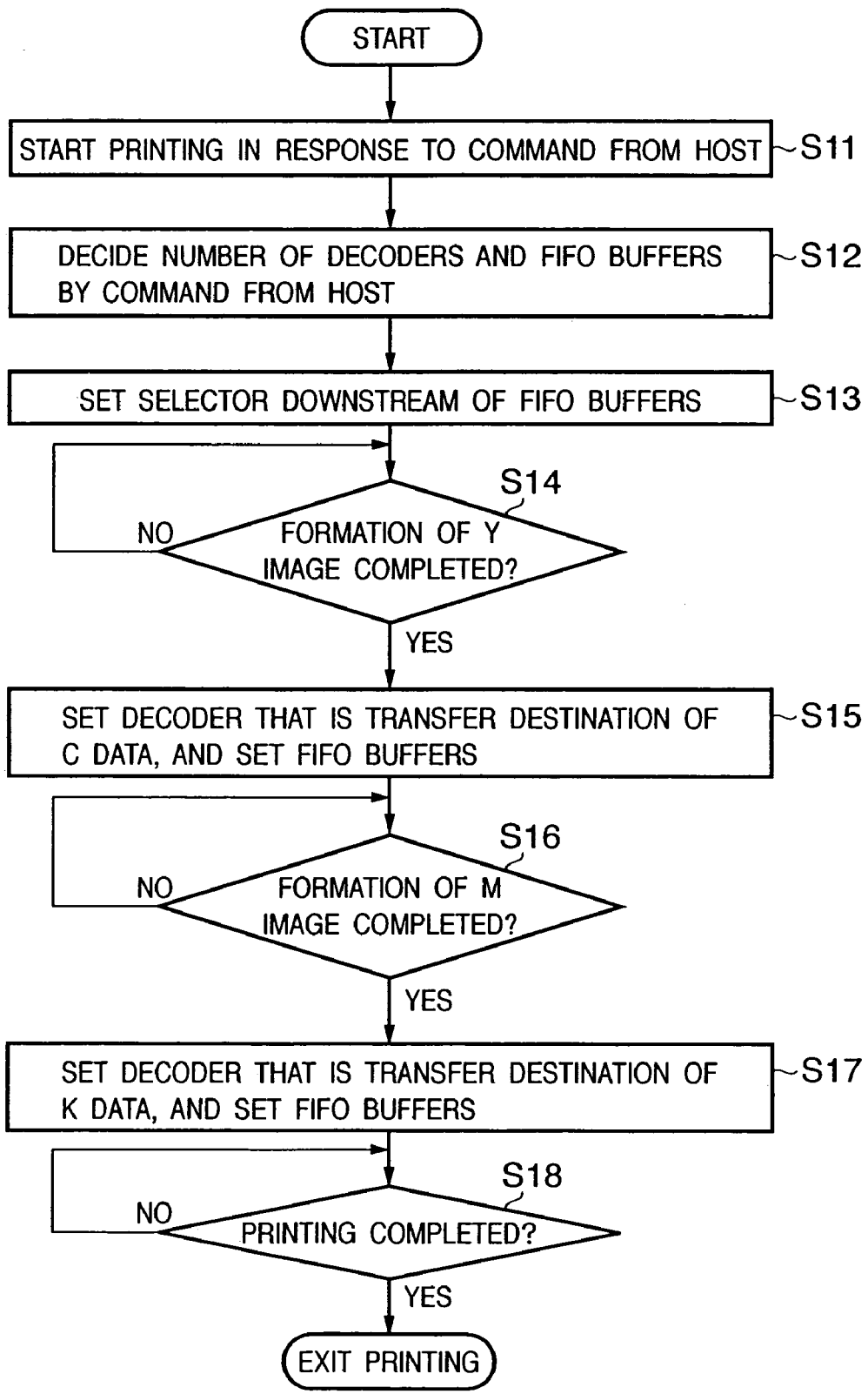
FIG. 7 is a flowchart for describing control processing in the 6-drum laser printer according to the second embodiment.

FIG. 7 is a flowchart illustrating processing executed by the laser printer according to the second embodiment of the present invention. The program that implements this processing has been stored in the memory 7a and is executed under the control of the CPU 7.

This processing starts under conditions where, e.g., one page of print data has been stored in the receive buffer 6. At step S11, the host PC 1 commands start of printing and printer information (number of photosensitive drums and total length D along which all of the drums are arrayed, etc.) is transmitted from the printer to the host computer 1.

As a result, the host computer 1 is capable of acquiring the number of drums of the printer, the drum spacing, the number of printable colors, the size of the image (the paper size) to be printed from this time onward and, if necessary, the number of decoders and the number of FIFO buffers, and can discriminate the number of photosensitive drums that will operate concurrently when printing of print data to be printed from this time onward is executed. On the basis of these numerical values, the host computer 1 can judge which decoders and FIFO buffers can be used in combination and, by sending these results to the printer, can set the decoders and FIFO buffers to be used concurrently and the changeover of the selectors 61, 63.

Thus, control proceeds to step S12, where the printer accepts the number of decoders to be used, the colors for which shared use is to be made of decoders and FIFO buffers and instructions concerning how to use the FIFO buffers. As a result, the decoders and FIFO buffers used and the selectors 61, 63 are set in accordance with the color data. In this example, the decoder 60a is used by colors Y and C and the decoder 60b by colors M and K. Similarly, colors Y and C each make use of FIFO buffers 62a, 62c in time-shared fashion, and colors M and K each make use of FIFO buffers 62b, 62d in time-shared fashion. As a result, the amount of data transferred by a FIFO per color can be increased. The output of the selector 63 downstream of the FIFO buffers is set at step S13. Specifically, the selector 63 is set in such a manner that when video data of color Y is flowing into the FIFO buffers 62a, 62c, the outputs of these FIFO buffers 62a, 62c are connected to the video interface 1. Further, the selector 63 is set in such a manner that when video data of color C is flowing into the FIFO buffers 62a, 62c, the outputs of these FIFO buffers 62a, 62c are connected to the video interface 3. Further, the selector 63 is set in such a manner that when video data of color M is flowing into the FIFO buffers 62b, 62d, the outputs of these FIFO buffers 62b, 62d are connected to the video interface 2, and in such a manner that when video data of color K is flowing into the FIFO buffers 62b, 62d, the outputs of these FIFO buffers 62b, 62d are connected to the video interface 4.

Thus, the images of colors Y, M are formed concurrently. Then, at step S14, it is determined whether image formation based upon the video data of color Y has been completed. If it has, control proceeds to step S15. Now the C data is transferred to the Y/C decoder 60a and the decoding of the print data of color C is started. Further, the output destinations of the two FIFO buffers 62a, 62b are set to the video interface 3 by the selector 63 at this time. As a result, the images of colors M, C are formed concurrently.

Thus, it is determined at step S16 whether the print data of color M has been decoded and the image of color M formed. If the image of color M has been formed, then control proceeds to step S17. Here the video data of color K for which the image is to be formed in parallel with the video data of color C is transferred to the M/K decoder 60b and starts to be decoded. The video data of color K thus decoded is sent to the FIFO buffers 62b, 62d in accordance with the setting of the selector 61. Further, the outputs of the two M/K FIFO buffers 62b, 62d are delivered to the video interface 4 by the selector 63. Such processing is executed repeatedly until printing is found to be completed at step S18.

Thus, in accordance with the second embodiment, as described above, two FIFO buffers can be used for data of one color and output the data of this color to the printer engine. This makes it possible to prevent the occurrence of a situation in which printing can no longer be performed because transfer of video data cannot keep up with the operating speed of the printer engine. Further, even if the compression rate of the print data is low and the speed at which print data is decoded cannot keep up with the speed at which image formation is performed by the printer engine 4, FIFO buffer capacity is essentially increased, thereby enabling printing to be carried out.

In accordance with the second embodiment as described above, the number of FIFO buffers used is twice the usual number and therefore a large quantity of video data can be buffered. This makes it possible to prevent a situation in which the transfer speed of video data cannot keep up with the speed of the printer engine.

Further, in accordance with the embodiments, the number of decoders and the number of FIFO buffers can be reduced in accordance with the size of the printing paper and the placement of the photosensitive drums. This leads to a reduction in cost.

Other Embodiments

The object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes per se read from the storage medium implement the novel functions of the embodiments and the storage medium storing the program codes constitutes the invention. Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, the present invention covers a case where an operating system or the like running on the computer performs a part of or the entire process in accordance with the designation of program codes and implements the functions according to the embodiments.

Furthermore, the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

The present invention is not limited to the above embodiments and various changes and modifications can be made within the spirit and scope of the present invention. Therefore, to apprise the public of the scope of the present invention, the following claims are made.

What is claimed is:

1. An image forming apparatus for forming an image by transferring images one after another to a printing medium by a plurality of image forming units disposed along a transport path of the printing medium, the apparatus comprising:

data processing units provided in a number smaller than the number of image forming units, each of said data processing units processing an image signal and generating image data for image formation;

data transfer units, which are provided in correspondence with respective ones of said data processing units, for supplying the image forming units with image data that has been generated by said data processing units; and control means which, in a case where length of the printing medium along the transport path is less than overall length along which the plurality of image forming units are disposed, is for assigning data processing units commonly to one image forming unit and outputting image data, which has been generated by said data processing units, to the corresponding image forming units via said data transfer units.

2. The apparatus according to claim 1, wherein each of the image forming units has an image carrier for forming and carrying an image in accordance with image data; and the number of said data processing units and the number of said data transfer units are the same, wherein the number corresponds to the number of the image carriers that are in contact with the printing medium simultaneously.

3. The apparatus according to claim 1, wherein said data transfer unit has a plurality of FIFO buffers and changeover means for changing over outputs of the plurality of FIFO buffers and supplying the outputs of the plurality of FIFO buffers to the image forming units.

4. The apparatus according to claim 1, wherein the number of said data transfer units is greater than the number of said data processing units and a plurality of said data transfer units are assigned to one image forming unit.

5. The apparatus according to claim 4, further comprising a selector for changing over a direction of data transfer between said data processing units and said data transfer units.

6. The apparatus according to claim 1, wherein the plurality of image forming units form images of colors that are different from one another.

7. The apparatus according to claim 1, wherein in a case where the length of the printing medium along the transport path is less than overall length along which the plurality of image forming units are disposed, said control means assigns a data processing unit, which had been assigned to a first image forming unit that completed image formation with transport of the printing medium, to a second image forming unit that is to form an image next, and outputs image data generated by said data processing unit to the second image forming unit via the assigned data transfer unit.

8. A method of controlling an image forming apparatus having data processing units provided in correspondence with image carriers in a number smaller than the number of image carriers, each of the data processing units processing an image signal and generating image data for image formation; data transfer units, which are provided in correspondence with respective ones of the data processing units, for supplying the image carriers with image data that has been generated by the data processing units; and a plurality of image forming units, which have the image carriers, for forming images on the image carriers in accordance with the image data, an image being formed by transferring images one after another to a printing medium from the plurality of image carriers disposed along a transport path of the printing medium, said method comprising steps of:
assigning data processing units commonly to one image forming unit and outputting image data, which has been generated by the data processing units, to the corresponding image forming units via the data transfer units in a case where the length of the printing medium along the transport path is less than overall length along which the plurality of image forming units are disposed.

9. The method according to claim 8, wherein the number of the data processing units and the number of said data transfer units are the same, wherein the number corresponds to the number of the image carriers that are in contact with the printing medium simultaneously.

10. The method according to claim 8, wherein the data transfer unit has a plurality of FIFO buffers and changes over outputs of the FIFO buffers and supplies the outputs of the plurality of FIFO buffers to the image forming units.

11. The method according to claim 8, wherein the number of the data transfer units is greater than the number of the data processing units and a plurality of the data transfer units are assigned to one image forming unit.

12. The method according to claim 11, further comprising a step of changing over a direction of data transfer between the data processing units and the data transfer units.

13. The method according to claim 8, wherein the plurality of image forming units form images of colors that are different from one another.

14. The method according to claim 8, further comprising a step of assigning a data processing unit, which had been assigned to a first image forming unit that completed image formation with transport of the printing medium, to a second image forming unit that is to form an image next and outputting image data generated by the data processing unit to the second image forming unit via the data transfer unit, in a case where the length of the printing medium along the transport path is less than overall length along which the plurality of image forming units are disposed.

15. An image forming apparatus for forming an image by transferring images one after another to a printing medium by a plurality of image forming units disposed along a transport path of the printing medium and corresponding to respective ones of colors, comprising:
data processing units provided in a first number smaller than the number of image forming units, each of said data processing units processing an image signal and generating image data for image formation;
data transfer units for supplying the image forming units with image data that has been generated by said data processing units; and
control means for exercising control so as to assign a first data processing unit, which had been assigned to a first image forming unit that completed image formation on the printing medium, to a second image forming unit that is to form an image next, and output image data generated by the first data processing unit to the second image forming unit via said data transfer unit;
wherein the first number corresponds to a number of image forming units capable of printing images on the printing medium concurrently.

16. The apparatus according to claim 15, wherein said control means assigns a data transfer unit, which had been assigned to a first image forming unit that completed image formation on the printing medium, to a second image forming unit that is to form an image next.

17. The apparatus according to claim 15, wherein said control means assigns a plurality of data transfer units to one image forming unit.

18. The apparatus according to claim 15, wherein the plurality of data transfer units transfer respective ones of image data of odd-numbered lines and image data of even-numbered lines.

* * * * *